US011775922B2

(12) United States Patent
Horesh et al.

(10) Patent No.: US 11,775,922 B2
(45) Date of Patent: Oct. 3, 2023

(54) LOGISTIC RECOMMENDATION ENGINE

(71) Applicant: Intuit Inc., Mountain View, CA (US)

(72) Inventors: Yair Horesh, Kfar Sava (IL); Yehezkel Shraga Resheff, Hasharon (IL); Adi Shalev, Herzliya (IL); Shlomi Medalion, Lod (IL); Elik Sror, Hod Hasharon (IL); Miriam Hanna Manevitz, Hasharon (IL); Sigalit Bechler, Hod Hasharon (IL)

(73) Assignee: Intuit Inc., Mountain View, CA (US)

( * ) Notice: Subject to any disclaimer, the term of this patent is extended or adjusted under 35 U.S.C. 154(b) by 312 days.

(21) Appl. No.: 16/861,157

(22) Filed: Apr. 28, 2020

(65) Prior Publication Data

US 2021/0334748 A1 Oct. 28, 2021

(51) Int. Cl.
*G06Q 10/0834* (2023.01)
*G06N 20/00* (2019.01)

(52) U.S. Cl.
CPC ......... *G06Q 10/0834* (2013.01); *G06N 20/00* (2019.01)

(58) Field of Classification Search
CPC .................................................... G06N 20/00
See application file for complete search history.

(56) References Cited

U.S. PATENT DOCUMENTS

| 9,811,838 | B1 * | 11/2017 | Daire | G06Q 10/0835 |
| 10,163,070 | B1 * | 12/2018 | Phillips | G06Q 10/0834 |
| 10,303,171 | B1 * | 5/2019 | Brady | G05D 1/0278 |
| 2010/0057652 | A1 * | 3/2010 | Seshan | G06Q 10/08355 |
| | | | | 706/19 |
| 2018/0232693 | A1 * | 8/2018 | Gillen | G06Q 10/0834 |
| 2018/0357736 | A1 * | 12/2018 | Sun | G06Q 50/30 |
| 2019/0180292 | A1 * | 6/2019 | Lutnick | G06Q 30/02 |
| 2020/0118071 | A1 * | 4/2020 | Venkatesan | G06N 20/00 |

FOREIGN PATENT DOCUMENTS

WO WO-03021472 A1 * 3/2003 ....... G06F 17/30864

OTHER PUBLICATIONS

Van Setten, Mark, et al.; Context-Aware Recommendations in the Mobile Tourist Application Compass; © Springer-Verlag Berlin Heidelberg 2004; AH 2004, LNCS 3137, pp. 235-244. (Year: 2004).*

* cited by examiner

*Primary Examiner* — Omar Zeroual
*Assistant Examiner* — Duane N. Moore
(74) *Attorney, Agent, or Firm* — Ferguson Braswell Fraser Kubasta PC

(57) ABSTRACT

A method may include receiving, for a package, shipment details including attributes, obtaining, for a subset of the attributes, logistic preferences, applying the logistic preferences to the shipment details to obtain modified shipment details, training a classifier using shipment transactions each including values for the attributes and labeled with a vendor logistic service, generating, by applying the classifier to the modified shipment details, scores for vendor logistic services, and recommending a vendor logistic service from the vendor logistic services using the scores.

20 Claims, 7 Drawing Sheets

LOGISTIC RECOMMENDATION ENGINE

BACKGROUND

Different online retail platforms (e.g., Amazon, Etsy, etc.) provide multiple potential logistic vendors each having a delivery matrix that includes attributes such as distance, package size, package weight, volume, worst case delivery time, average delivery time, insurance, etc. Selecting a logistic vendor may be challenging for product-based small businesses that conduct business via multiple online retail platforms, and may involve tradeoffs among various factors.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including receiving, for a package, shipment details including attributes, obtaining, for a subset of the attributes, logistic preferences, applying the logistic preferences to the shipment details to obtain modified shipment details, training a classifier using shipment transactions each including values for the attributes and labeled with a vendor logistic service, generating, by applying the classifier to the modified shipment details, scores for vendor logistic services, and recommending a vendor logistic service from the vendor logistic services using the scores.

In general, in one aspect, one or more embodiments relate to a system including a computer processor and a repository configured to store shipment details including attributes, logistic preferences for a subset of the attributes, and shipment transactions each including values for the attributes and labeled with a vendor logistic service. The system further includes a recommendation engine executing on the computer processor and configured to receive, for a package, the shipment details, obtain the logistic preferences for the subset of the attributes, apply the logistic preferences to the shipment details to obtain modified shipment details, train a classifier using the shipment transactions, generate, by applying the classifier to the modified shipment details, scores for vendor logistic services, and recommend a vendor logistic service from the vendor logistic services using the scores.

In general, in one aspect, one or more embodiments relate to a method including receiving, for a package and via a graphical user interface (GUI) generated by a computer processor, shipment details including attributes, obtaining, for a subset of the attributes, logistic preferences, and sending the shipment details and the logistic preferences to a scenario engine. The scenario engine applies the logistic preferences to the shipment details to obtain modified shipment details, trains a classifier using shipment transactions each including values for the attributes and labeled with a vendor logistic service, generates, by applying the classifier to the modified shipment details, scores for vendor logistic services, and recommends a vendor logistic service from the vendor logistic services using the scores. The method further includes receiving, via the GUI, a recommendation of the vendor logistic service, and displaying, in an element within the GUI, the recommendation of the vendor logistic service, and initiating, via the GUI, an interaction with the vendor logistic service.

Other aspects of the invention will be apparent from the following description and the appended claims.

DETAILED DESCRIPTION

Figure 1:
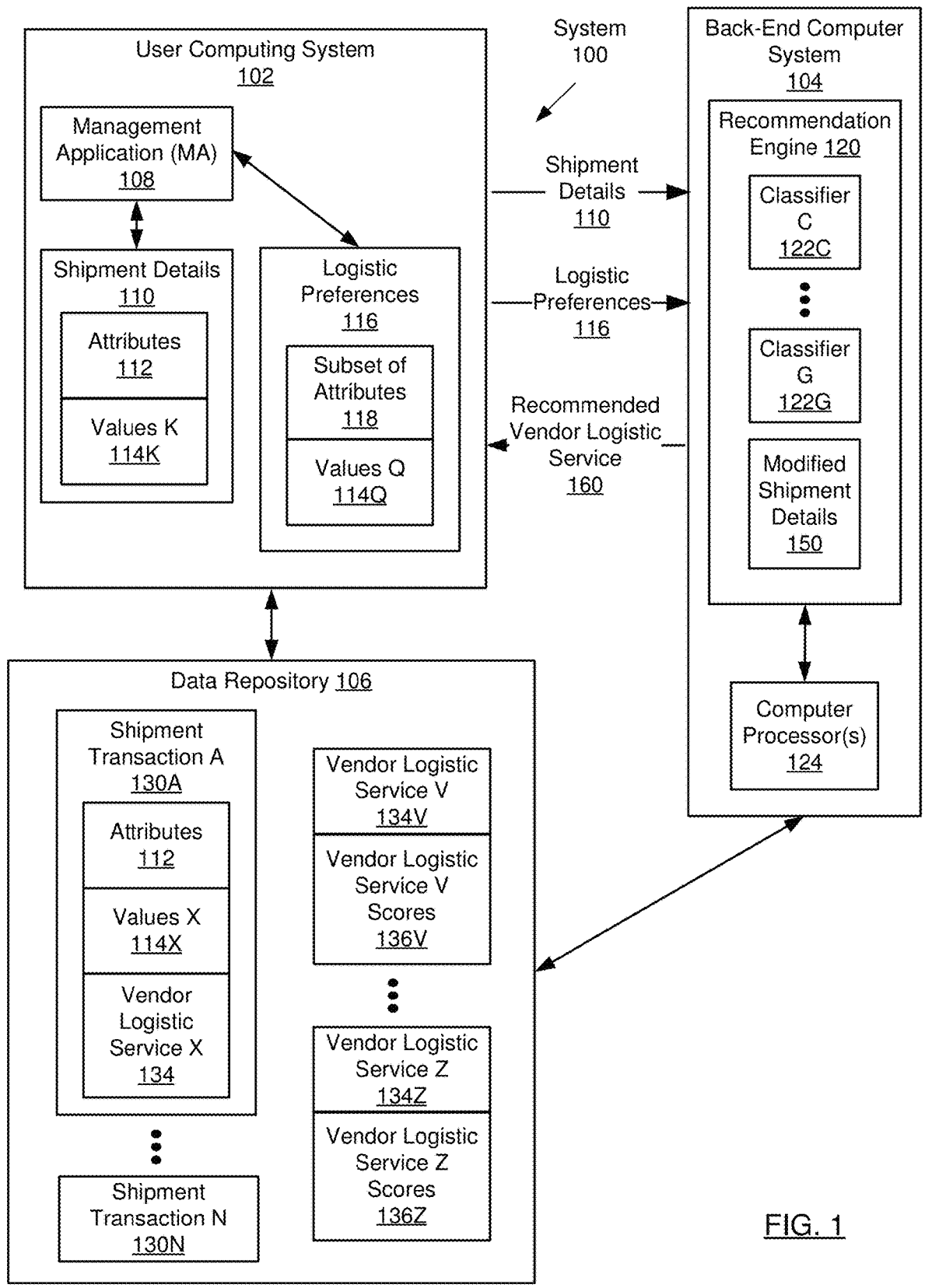
FIG. 1 and FIG. 2 show a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

It is often challenging for small business owners to select a shipping service to ship packages to customers in a way that best satisfies the preferences of the small business owner and/or the customer. Each shipping vendor may provide multiple such shipping services. For example, one shipping service may guarantee delivery in a specific timeframe (e.g., UPS Next Day Air, DHL Same Day), or may provide low cost shipping (e.g., Fedex Ground or UPS Ground). The small business owner may use a software application, such as QuickBooks Online, to assist in the management of various aspects of his/her business (e.g., finances, inventory management, etc.).

The disclosed invention provides a new capability for such a software application: recommending the shipping service that best matches a given set of shipment details and preferences. The shipment details may include details of a package, such as size, weight, and volume. The shipment details may also include details such as distance, worst-case delivery time, average delivery time, insurance, etc. The preferences may be preferences of the small business owner (i.e., the sender) and/or the customer (i.e., the recipient), such as preferred delivery time or special handling instructions. The small business owner may enter the shipment details and preferences into a graphical user interface (GUI) of the software application. The software application may send the shipment details and preferences to a recommendation engine.

The recommendation engine is trained using a large number of (anonymized) shipment transactions of many users (e.g., many small businesses) of the software application, where each shipment transaction is labeled with a shipping service. Training the recommendation engine on the shipment transactions enables the recommendation engine to learn the correlation of shipment details to different shipping services. The recommendation engine generates scores for different shipping services by applying one or more classifiers to the shipment details as modified by the preferences. The classifiers may be trained using different subsets of shipment transactions. For example, the different subsets of historical shipment transactions may correspond to packages sent by the sender, packages sent from the origin location, packages received at the destination location, etc. Each score may represent the probability that the corresponding shipping service represents the best match to the modified shipment details. The recommendation engine then sends the recommendation to the small business owner via the GUI of the software application.

The small business owner is thus empowered to find the shipping service that best conforms to the preferences of the small business owner and/or the customer. The small business owner is more likely to save on shipping costs while satisfying customer expectations and increasing customer goodwill, potentially resulting in increased sales and positive customer ratings.

FIG. 1 shows a flow diagram of a system (100) in accordance with one or more embodiments. As shown in FIG. 1, the system (100) includes multiple components such as the user computing system (102), a back-end computer system (104), and a data repository (106). Each of these components is described below.

In one or more embodiments, the user computing system (102) provides, to a user, a variety of computing functionality. For example, the computing functionality may include word processing, multimedia processing, financial management, business management, social network connectivity, network management, and/or various other functions that a computing device performs for a user. The user may be a small business owner. Alternatively, the user may be a company employee that acts as a sender, a potential sender, or a requestor of services performed by a company (e.g., a client, a customer, etc.) of the user computing system. The user computing system (102) may be a mobile device (e.g., phone, tablet, digital assistant, laptop, etc.) or any other computing device (e.g., desktop, terminal, workstation, etc.) with a computer processor (not shown) and memory (not shown) capable of running computer software. The user computing system (102) may take the form of the computing system (500) shown in FIG. 5A connected to a network (520) as shown in FIG. 5B.

The user computing system (102) includes a management application (MA) (108), shipment details (110), and logistic preferences (116) in accordance with one or more embodiments. The shipment details (110) and/or logistic preferences (116) may be stored in the data repository (106). The MA (108), in accordance with one or more embodiments, is a software application written in any programming language that includes executable instructions stored in some sort of memory. The instructions, when executed by one or more processors, enable a device to perform the functions described in accordance with one or more embodiments. In one or more embodiments, the MA (108) is capable of assisting a user with the user's finances or business needs. For example, the MA (108) may be any type of financially-based application such as a tax program, a personal budgeting program, a small business financial program, or any other type of program that assists with finances.

The MA (108) may include a user interface (UI) (not shown) for receiving input from a user and transmitting output to the user. For example, the UI may be a graphical user interface or other user interface. The UI may be rendered and displayed within a local desktop software application or the UI may be generated by a remote web server and transmitted to a user's web browser executing locally on a desktop or mobile device. For example, the UI may be an interface of a software application providing the functionality to the user (e.g., a local gaming application, a word processing application, a financial management application, network management application, business management application etc.). In such a scenario, the help menu, popup window, frame, or other portion of the UI may connect to the MA (108) and present output.

The MA (108) may include functionality to send shipment details (110) and/or logistic preferences (116) to the recommendation engine (120). The shipment details (110) describe various aspects of a shipment of a package in terms of attributes (112) and corresponding values (114K) in accordance with one or more embodiments. For example, the attributes (112) may include objective attributes such as: package size, package weight, package volume, origin location (e.g., zip code), destination location, distance traveled, sender of the package, recipient of the package, cost, normalized cost relative to another attribute (e.g., weight or distance traveled), worst case delivery time, average delivery time, insurance, whether the package is fragile, whether the package is temperature-sensitive, special handling instructions (e.g., for a fragile or temperature-sensitive package), etc. In addition, the attributes (112) may include subjective attributes such as sender satisfaction and/or recipient satisfaction (e.g., rated on a scale from 1 to 5 stars). Examples of values (114K) may include numerical or symbolic values, such as a zip code of "94043" (e.g., for a location attribute), 10 pounds (e.g., for a package weight attribute), 5 stars (e.g., for a recipient satisfaction attribute), etc.

In one or more embodiments, the logistic preferences (116) include values (114Q) for a subset of attributes (118). The subset of attributes (118) may correspond to the package to be shipped, the sender, and/or the recipient. For example, the value of a "handling instructions" attribute of a logistic preference corresponding to the package may be "pack in ice". As another example, the value of a "delivery time" attribute of a logistic preference corresponding to the sender or recipient may be "overnight".

Figure 2:
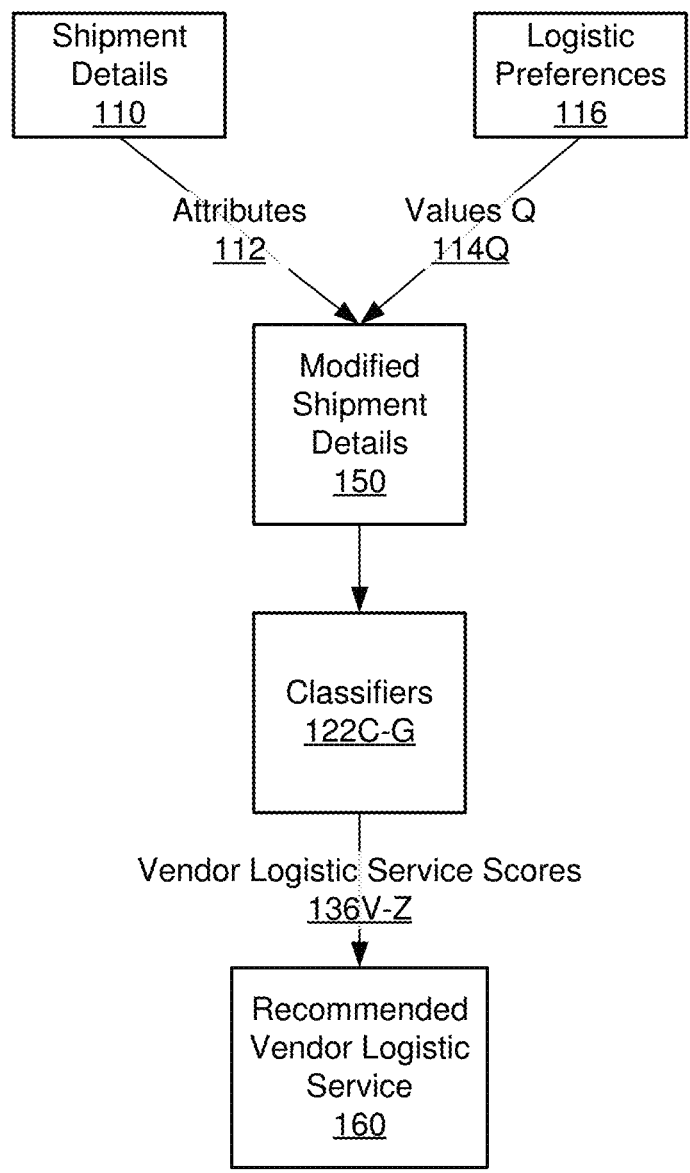

Turning to FIG. 2, the recommendation engine (120) includes functionality to modify the shipment details (110) based on the logistic preferences (116) to generate modified shipment details (150). For example, the recommendation engine (120) may modify a default value or provide a missing value for one or more attributes (112) of the shipment details (110) based on the values (114Q) of the logistic preferences (116).

The MA (108) includes functionality to receive shipment details (110) and/or logistic preferences (116) via a graphical user interface (GUI). The MA (108) includes functionality to receive values for one or more attributes values for one or more attributes of the shipment details (110) via the GUI and/or hardware devices. For example, the MA (108) may receive the values of "size", "weight", and/or volume attributes from a device (e.g., a smartphone or other handheld device equipped with a camera or other device) that electronically scans the package to be shipped.

Continuing with FIG. 1, the data repository (106) is any type of storage unit and/or device (e.g., a file system, database, collection of tables, or any other storage mechanism) for storing data. Further, the data repository (106) may include multiple different storage units and/or devices. The multiple different storage units and/or devices may or may not be of the same type or located at the same physical site. The data repository (106) may be accessed online via a cloud service (e.g., Amazon Web Services, Egnyte, Azure, etc.).

In one or more embodiments, the data repository (106) includes functionality to store shipment transactions (130A, 130N), vendor logistic services (134V, 134Z), and vendor logistic service scores (136V, 136Z). Each shipment transaction (130A) is a record of a shipment described in terms of attributes (112), values (114X) corresponding to the attributes (112), and a vendor logistic service (134) in accordance with one or more embodiments. The shipment transactions (130A, 130N) may correspond to multiple users of the MA (108). The vendor logistic service (134) may correspond to a level of service provided by a shipping vendor. The level of service may correspond to specific values of one or more of the attributes (112). For example, a level of service may correspond to a value of 2 days for a delivery interval attribute. Alternatively, the level of service may correspond to specific ranges of values of one or more of the attributes (112). Examples of vendor logistic services (134) include United Parcel Service (UPS) Direct Delivery, DHL Express, etc.

The back-end computer system (104) is communicatively connected to the user computing system (102) such as through one or more networks. The back-end computer system (104) may include a recommendation engine (120) and computer processor(s) (124). Returning to FIG. 2, the recommendation engine (120) includes functionality to generate vendor logistic service scores (136V, 136Z) for vendor logistic services (134V, 134Z) by applying one or more classifiers (122C, 122G) to the modified shipment details (150). Each vendor logistic service (134V) may correspond to one or more vendor logistic service scores (136V) generated by one or more classifiers (122C, 122G). Each of the vendor logistic service scores (136V) indicates the probability that the corresponding vendor logistic service (134V) represents the best match to the modified shipment details (150), according to the corresponding classifier (122C). The recommendation engine (120) includes functionality to output (e.g., to the MA (108)) a recommended vendor logistic service (160) using the vendor logistic service scores (136V, 136Z).

In one or more embodiments, the classifiers (122C, 122G) are trained using different subsets of the shipment transactions (130A, 130N). For example, the different subsets of the shipment transactions (130A, 130N) may correspond to one or more of the following: packages sent by the sender, packages sent from the origin location, packages received at the destination location, packages received by the recipient, packages sent within a specific time interval, etc. As another example, a subset of the shipment transactions (130A, 130N) may correspond to packages sent by other senders in the same industry as the sender (e.g., where each sender has a corresponding sender profile that includes an industry code). The vendor logistic service (134) of each shipment transaction (130A) may be the label used to train the classifiers (122C, 122G).

The recommendation engine (120) includes functionality to combine the vendor logistic service scores (136V) for a vendor logistic service (134V) according to a policy. For example, the policy may weigh the vendor logistic service scores (136V) based on weights corresponding to the different subsets of the shipment transactions (130A, 130N). Continuing this example, the subset of the shipment transactions (130A, 130N) corresponding to packages sent by the sender may have the highest weight. As another example, the vendor logistic service score for a vendor logistic service (134V) may be the maximum score generated for the vendor logistic service (134V) by any of the classifiers (122C, 122G).

The classifiers (122C, 122G) may be implemented as various types of deep learning classifiers such as a neural network classifier (e.g., based on convolutional neural networks (CNNs)), random forest classifier, stochastic gradient descent (SGD) classifier, lasso classifier, gradient boosting classifier such as XGBoost, bagging classifier, adaptive boosting (AdaBoost) classifier, ridge classifier, elastic net classifier, or Nu Support Vector Regression (NuSVR) classifier. Deep learning, also known as deep structured learning or hierarchical learning, is part of a broader family of machine learning methods based on learning data representations, as opposed to task-specific algorithms.

In one or more embodiments, the computer processor(s) (124) takes the form of the computer processor(s) (502) described with respect to FIG. 5A and the accompanying description below.

While FIG. 1 and FIG. 2 show a configuration of components, other configurations may be used without departing from the scope of the invention. For example, various components may be combined to create a single component. As another example, the functionality performed by a single component may be performed by two or more components.

Figure 3A:
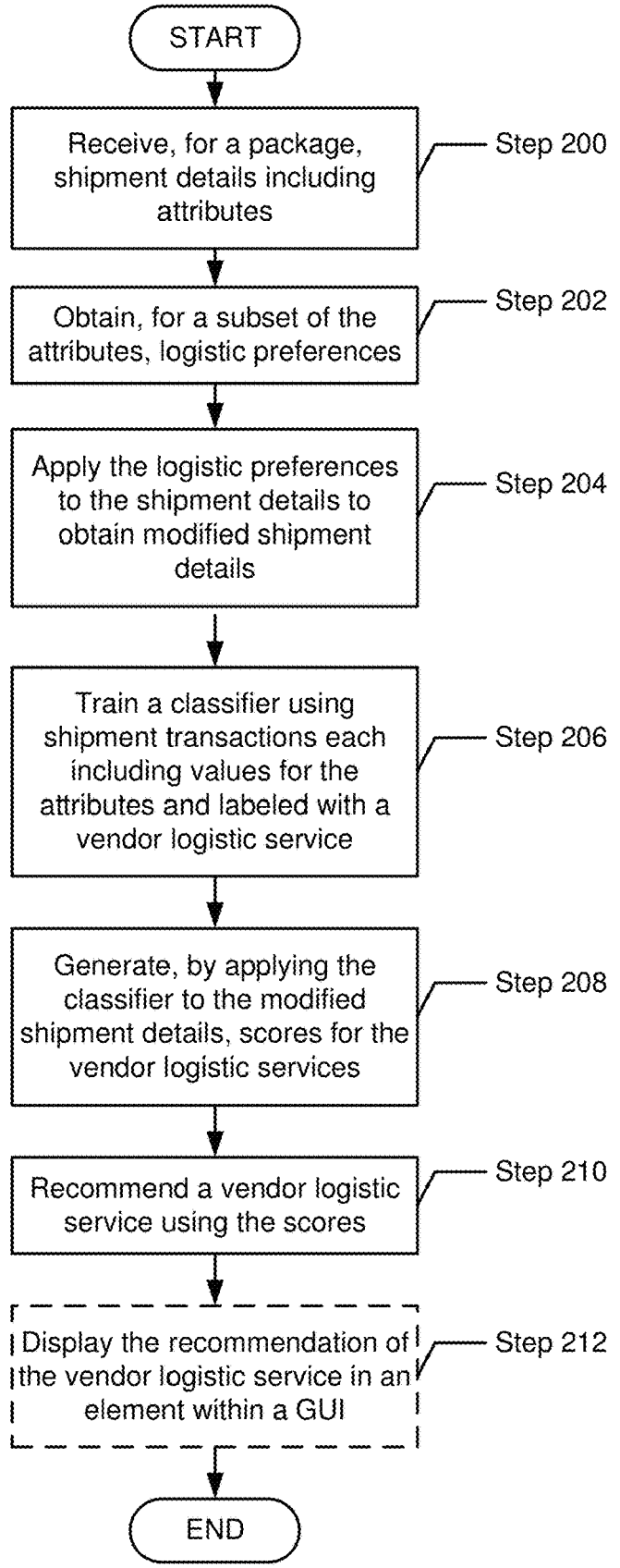
FIG. 3A and FIG. 3B show flowcharts in accordance with one or more embodiments of the invention.

FIG. 3A shows a flowchart in accordance with one or more embodiments of the invention. The flowchart depicts a process for recommending a vendor logistic service. One or more of the steps in FIG. 3A may be performed by the components (e.g., the recommendation engine (120) of the back-end computer system (104) and the management application (108) of the user computing system (102)), discussed above in reference to FIG. 1. In one or more embodiments of the invention, one or more of the steps shown in FIG. 3A may be omitted, repeated, and/or performed in parallel, or in a different order than the order shown in FIG. 3A. Accordingly, the scope of the invention should not be considered limited to the specific arrangement of steps shown in FIG. 3A.

Initially, in Step 200, shipment details including attributes are received for a package. In one or more embodiments, the recommendation engine receives the shipment details from the management application. For example, the management application may receive the shipment details from the sender of the package via a graphical user interface (GUI). In one or more embodiments, values for one or more of the attributes (e.g., attributes of the package such as size, weight, volume, etc.) of the shipment details may be received by applying a scanning device to the package. In one or more embodiments, values for one or more of the attributes (e.g., attributes corresponding to the product to be shipped in the package) of the shipment details may be extracted by parsing raw order text received via the GUI.

In Step 202, logistic preferences are obtained for a subset of the attributes. In one or more embodiments, the recommendation engine obtains the logistic preferences from the management application. For example, the management application may obtain the logistic preferences from the sender of the package via the GUI. Continuing this example, the management application may obtain from the sender, via the GUI, logistic preferences corresponding to the package, logistic preferences corresponding to the recipient of the package, and/or logistic preferences corresponding to the sender. In one or more embodiments, any attributes whose value was received in Step 200 above are external to the subset of the attributes.

In one or more embodiments, the recommendation engine obtains one or more of the logistic preferences by analyzing historical shipment transactions. For example, the recommendation engine may obtain logistic preferences corresponding to the sender of the package by analyzing historical shipment transactions corresponding to the sender. Continuing this example, the recommendation engine may calculate, as a logistic preference corresponding to the sender, a harmonic mean of the values for the attribute in the historical shipment transactions corresponding to the sender. Similarly, the recommendation engine may calculate, as a logistic preference corresponding to the recipient of the package, a harmonic mean of the values for the attribute in the historical shipment transactions corresponding to the recipient. For example, the harmonic mean may be used to smooth the impact of outlier or anomalous values. Alternatively, a geometric mean or an average may be used to calculate the logistic preference(s).

In Step 204, the logistic preferences are applied to the shipment details to obtain modified shipment details. In one or more embodiments, the recommendation engine applies the logistic preferences to obtain the modified shipment details by assigning the value of an attribute in the shipment details to be the value specified for the attribute in the logistic preferences.

In one or more embodiments, a value specified in the logistic preferences is mapped before applying the logistic preferences to the shipment details. For example, the logistic preferences may specify a value of "fast" for a "shipping speed" attribute, and the value of "fast" may be mapped to a value of "overnight" or "next day".

In Step 206, a classifier is trained using shipment transactions each including values for the attributes and labeled with a vendor logistic service. The recommendation engine may obtain the shipment transactions from a repository that includes shipment transactions for the users of the MA. The vendor logistic service of each shipment transaction may be the label used to train the classifier.

In Step 208, scores for vendor logistic services are generated by applying the classifier to the modified shipment details. Each score generated by the classifier indicates the probability that the corresponding vendor logistic service represents the best match to the values of the attributes in the modified shipment details.

In one or more embodiments, the recommendation engine applies multiple classifiers to the modified shipment details to generate, for each vendor logistic service, a score corresponding to each classifier. For example, the multiple classifiers may be trained using different subsets of the shipment transactions.

In Step 210, a vendor logistic service is recommended using the scores. In one or more embodiments, the recommendation engine recommends the vendor logistic service corresponding to the highest score generated by the (single) classifier. Alternatively, if multiple classifiers have been applied to the modified shipment details, then the recommendation engine may generate (e.g., according to a policy) a combined score from the individual scores generated by the multiple classifiers. For example, the recommendation engine may generate the combined score using a weighted average of the individual scores. Continuing this example, the weights may correspond to the relative importance of the subsets of the shipment transactions used to train the classifiers. Further continuing this example, the subset of the shipment transactions corresponding to packages sent by the sender or the recipient may have the highest weight.

In Step 212, the recommendation of the vendor logistic service is displayed via an element within a graphical user interface (GUI). The element (e.g., a widget) may be generated by a computer processor and rendered within the GUI. The recommendation engine may initiate an interaction with the vendor logistic service via the GUI. For example, the GUI may display a link to a website of a logistic vendor where the sender may initiate a shipment transaction to ship the package using the recommended vendor logistic service and the modified shipment details.

In one or more embodiments, the GUI displays a subset of the vendor logistic services and the scores corresponding to the displayed vendor logistic services For example, the GUI may display, for the vendor logistic services corresponding to the three highest scores generated in Step 208 above, values of attributes in proposed shipment transactions to ship the package via the corresponding vendor logistic service.

In one or more embodiments, the recommendation engine may receive, in response to displaying the recommendation of the vendor logistic service via the GUI, a notification of a completed shipment transaction that shipped the package using the recommended vendor logistic service. In response to receiving the notification of the completed shipment transaction, the recommendation engine may update, using the values for the attributes of the completed shipment transaction, the classifier(s) used to generate the scores. In other words, the recommendation engine may update the classifier(s) as completed shipment transactions are received. The completed shipment transaction may include values for one or more subjective attributes, such as a sender satisfaction attribute and/or a recipient satisfaction attribute.

Figure 3B:
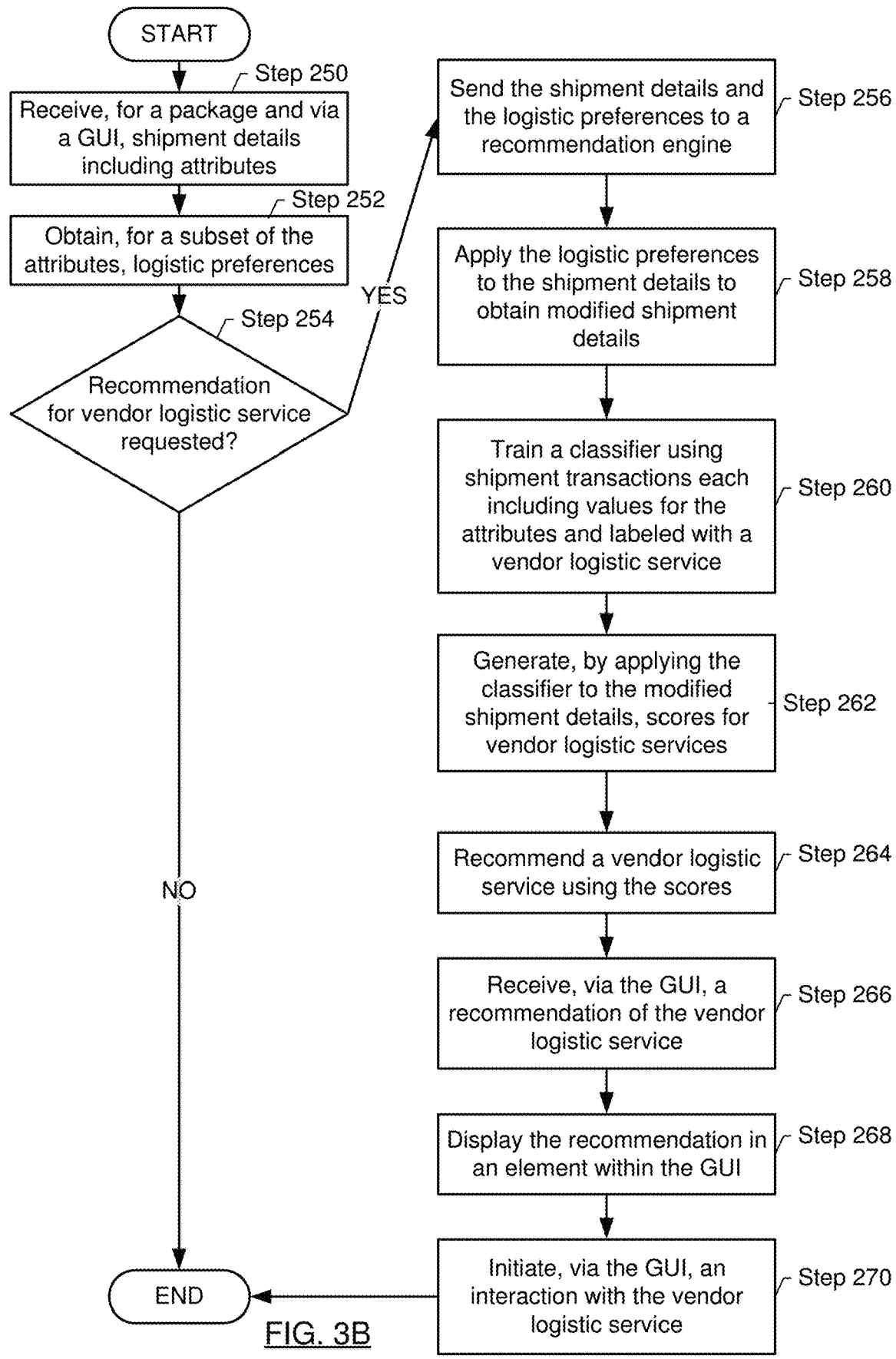

FIG. 3B shows a flowchart in accordance with one or more embodiments of the invention. The flowchart depicts a process for recommending a vendor logistic service. One or more of the steps in FIG. 3B may be performed by the components (e.g., the recommendation engine (120) of the back-end computer system (104) and the management application (108) of the user computing system (102)), discussed above in reference to FIG. 1. In one or more embodiments of the invention, one or more of the steps shown in FIG. 3B may be omitted, repeated, and/or performed in parallel, or in a different order than the order shown in FIG. 3B. Accordingly, the scope of the invention should not be considered limited to the specific arrangement of steps shown in FIG. 3B.

Initially, in Step 250, shipment details including attributes are received for a package via a graphical user interface (GUI) (see description of Step 200 above).

In Step 252, logistic preferences are obtained for a subset of the attributes (see description of Step 202 above).

If, in Step 254, a determination is made that a recommendation has been requested for a vendor logistic service, then Step 256, Step 258, Step 260, Step 262, Step 264, Step 266, and Step 268 below are executed.

In Step 256, the shipment details and the logistic preferences are sent to the recommendation engine. The shipment details and the logistic preferences may be sent to the recommendation engine by the management application over a network.

In Step 258, the logistic preferences are applied to the shipment details to obtain modified shipment details (see description of Step 204 above).

In Step 260, a classifier is trained using shipment transactions each including values for the attributes and labeled with a vendor logistic service (see description of Step 206 above).

In Step 262, scores for vendor logistic services are generated by applying a classifier to the modified shipment details (see description of Step 208 above).

In Step 264, a vendor logistic service is recommended using the scores (see description of Step 210 above).

In Step 266, the recommendation of the vendor logistic service is received by the GUI. In one or more embodiments, the recommendation is sent, over the network, by the recommendation engine to the management application.

In Step 268, the recommendation of the vendor logistic service is displayed via an element within the GUI (see description of Step 210 above).

In Step 270, an interaction with the recommended vendor logistic service is initiated via the GUI (see description of Step 212 above).

Figure 4A:
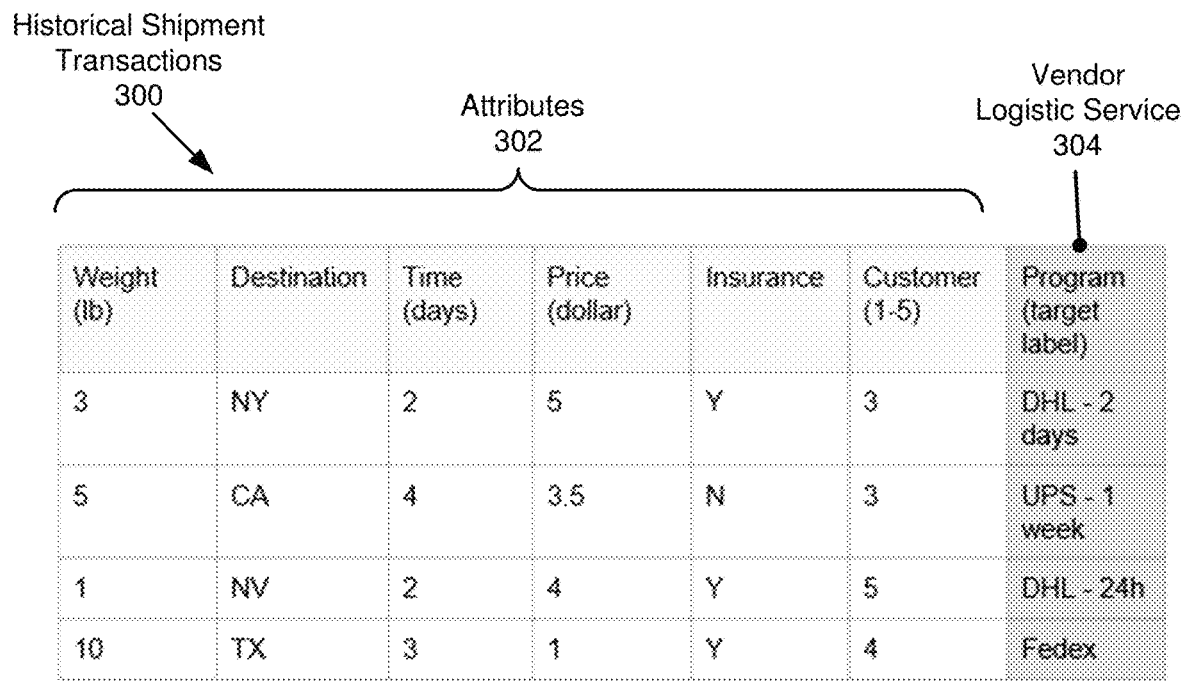
FIG. 4A and FIG. 4B show examples in accordance with one or more embodiments of the invention.
Figure 4A:
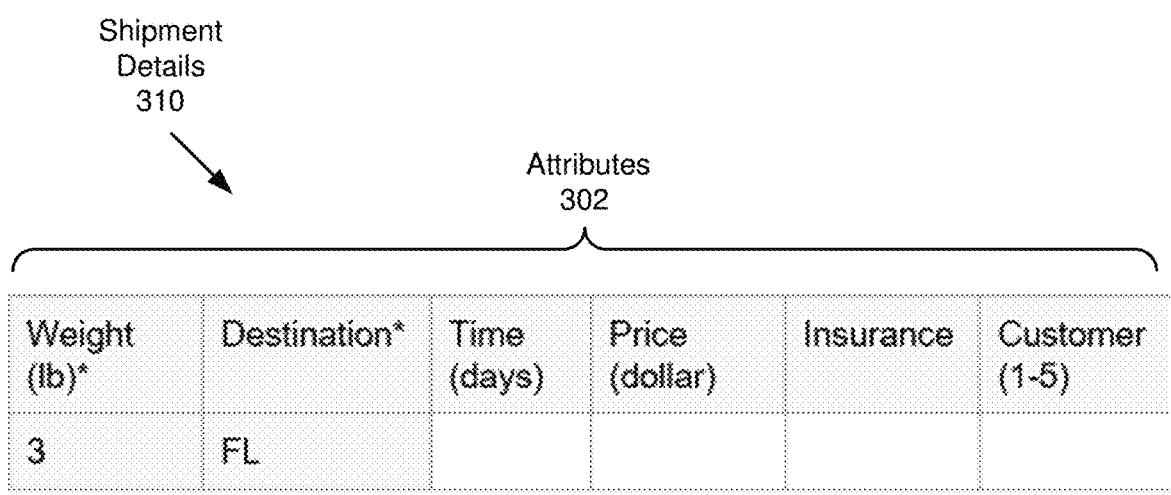
Figure 4B:
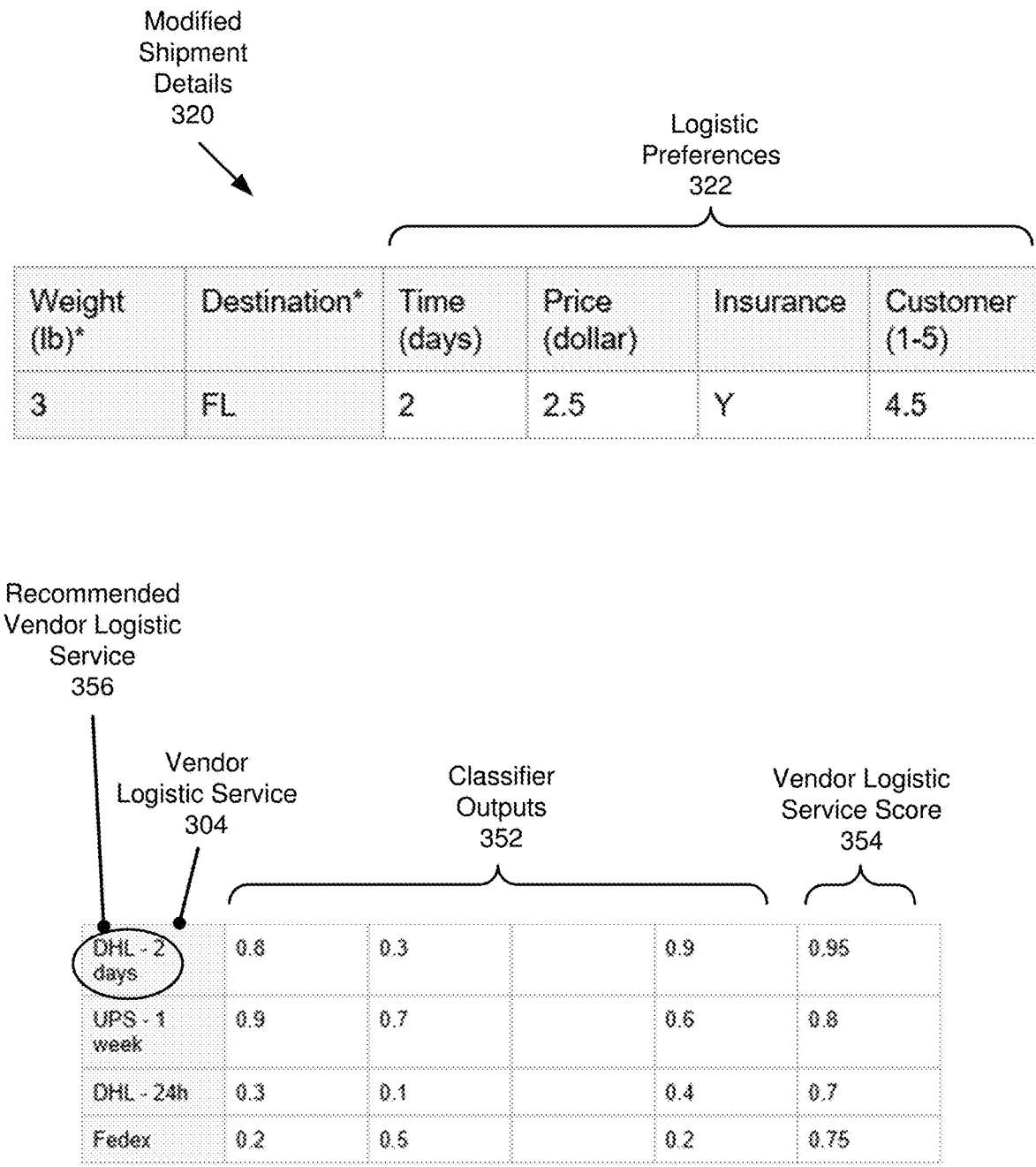

The following example is for explanatory purposes only and not intended to limit the scope of the invention. FIG. 4A and FIG. 4B show an implementation example in accordance with one or more embodiments of the invention. FIG. 4A shows historical shipment transactions (300) ((130A, 130N) in FIG. 1) each including values of attributes (302) ((112) in FIG. 1) and a vendor logistic service (304) ((134) in FIG. 1). The historical shipment transactions (300) are used to train a set of classifiers whose corresponding classifier outputs (352) are shown in FIG. 4B. FIG. 4A further shows shipment details (310) ((110) in FIG. 1 and FIG. 2) for a package to be shipped including values for some of the attributes (302), namely the weight and destination attributes. The shipment details (310) are received via the graphical user interface (GUI) of the management application of the user computing system.

FIG. 4B shows modified shipment details (320) ((150) in FIG. 1 and FIG. 2) based on applying logistic preferences (322) ((116) in FIG. 1 and FIG. 2) to a subset of the attributes (302) of the shipment details (310). The subset of the attributes (302) includes: time, price, insurance, and customer satisfaction. The logistic preferences (322) are obtained from the sender of the package via the GUI of the management application. The management application sends the shipment details (320) and logistic preferences (322) to the recommendation engine, at which point the recommendation engine applies the logistic preferences (322) to the shipment details (310) to generate the modified shipment details (320). The recommendation engine applies the set of classifiers to the modified shipment details (320) to generate classifier outputs (352). The recommendation engine combines the classifier outputs (352) for each vendor logistic service (304) into a vendor logistic service score (354) ((136V, 136Z) in FIG. 1 and FIG. 2). Each vendor logistic service score (354) represents the probability that the corresponding vendor logistic service (304) is the best match to the modified shipment details (320). The recommendation engine then selects the vendor logistic service "DHL-2 days" corresponding to the highest vendor logistic service score as the recommended vendor logistic service (356) ((160) in FIG. 1 and FIG. 2).

Embodiments of the invention may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 5A:
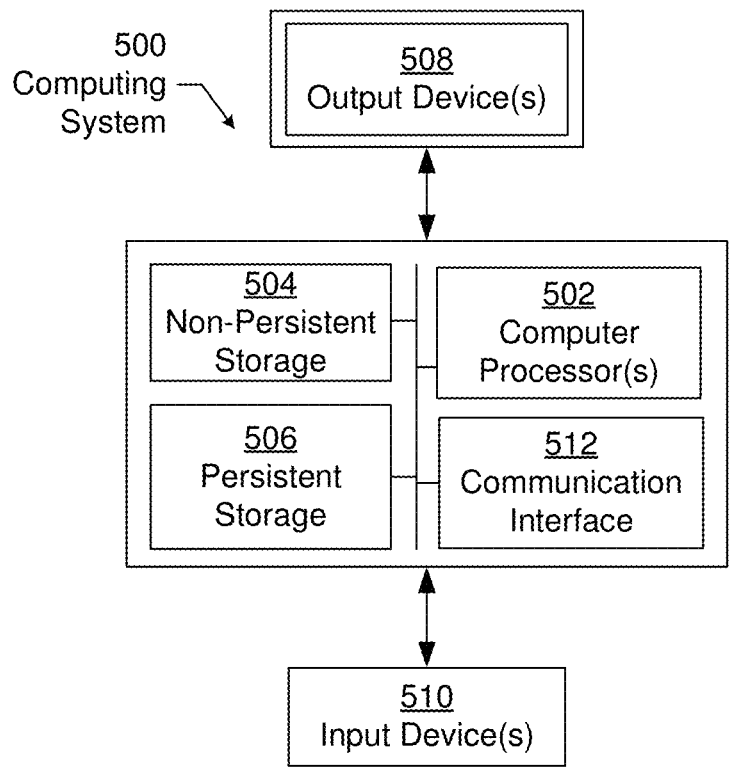
FIG. 5A and FIG. 5B show computing systems in accordance with one or more embodiments of the invention.
Figure 5B:
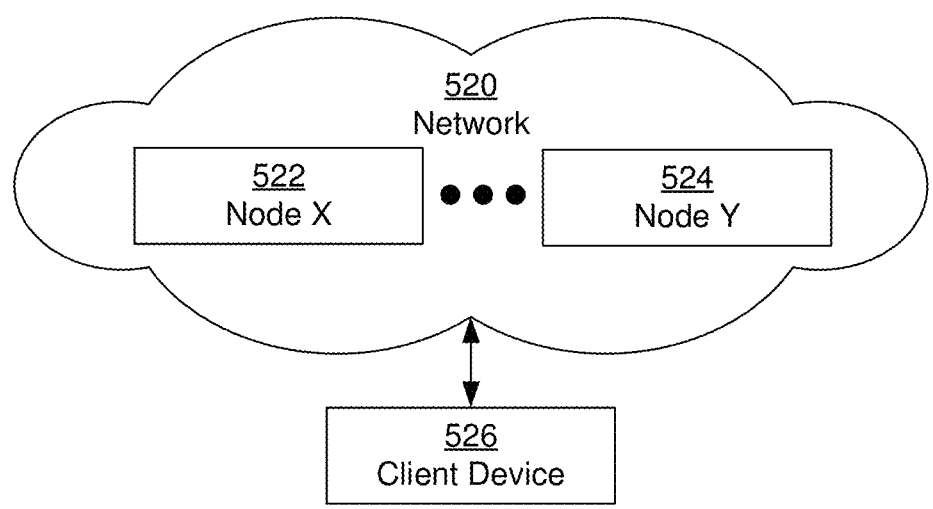

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the invention.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 5A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present only a few examples of functions performed by the computing system of FIG. 5A and the nodes and/or client device in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:
1. A method comprising:
receiving, for a package and from a graphical user interface, shipment details comprising a plurality of attributes;
obtaining, for a subset of the plurality of attributes, a plurality of logistic preferences;
applying the plurality of logistic preferences to the shipment details to obtain modified shipment details;
training a classifier, of a plurality of classifiers, using a plurality of shipment transactions comprising a shipment transaction comprising a plurality of values for the plurality of attributes and labeled with a vendor logistic service of a plurality of vendor logistic services;

generating, by applying the classifier to the modified shipment details, a plurality of scores for the plurality of vendor logistic services,
wherein the classifier is one of the plurality of classifiers that are applied to the modified shipment details, and
wherein a score of the plurality of scores is a weighted combination of a plurality of classifier outputs identifying probabilities of matches, between the plurality of vendor logistic services and the modified shipment details, and generated using a harmonic mean in the modified shipment details; and presenting a recommendation of the vendor logistic service, from the plurality of vendor logistic services, using the score generated from the output, from a classifier of the plurality of classifiers, that identifies a probability that the vendor logistic service matches to the modified shipment details.

2. The method of claim 1, wherein the plurality of attributes comprises an origin location of the package and a destination location of the package.

3. The method of claim 1, further comprising:
obtaining, by applying a scanning device to the package, a value for an attribute of the plurality of attributes, wherein the attribute is external to the subset of the plurality of attributes.

4. The method of claim 1, wherein the plurality of logistic preferences comprises preferences corresponding to the package, preferences corresponding to a sender of the package, and preferences corresponding to a recipient of the package.

5. The method of claim 1, further comprising:
obtaining a plurality of shipment transactions each comprising a value for an attribute of the plurality of attributes, wherein the attribute corresponds to a logistic preference of the plurality of logistic preferences; and
generating the logistic preference by calculating the harmonic mean of the values for the attribute in the plurality of shipment transactions.

6. The method of claim 1, further comprising:
training the plurality of classifiers using different subsets of the plurality of shipment transactions, wherein generating the plurality of scores comprises:
applying the plurality of classifiers to the modified shipment details to obtain the plurality of classifier outputs; and
combining, according to a policy, the plurality of classifier outputs.

7. The method of claim 1, further comprising:
displaying, in an element within a graphical user interface (GUI) generated by a computer processor, the recommendation of the vendor logistic service; and
initiating, via the GUI, an interaction with the vendor logistic service.

8. A system, comprising:
a computer processor;
a repository configured to store:
shipment details comprising a plurality of attributes,
a plurality of logistic preferences for a subset of the plurality of attributes, and
a plurality of shipment transactions comprising a shipment transaction comprising a plurality of values for the plurality of attributes and labeled with a vendor logistic service of a plurality of vendor logistic services; and a recommendation engine, executing on the computer processor, configured to:
receive, for a package and from a graphical user interface, the shipment details, obtain the plurality of logistic preferences for the subset of the plurality of attributes, apply the plurality of logistic preferences to the shipment details to obtain modified shipment details,
train a classifier, of a plurality of classifiers, using the plurality of shipment transactions,
generate, by applying the classifier to the modified shipment details, a plurality of scores for the plurality of vendor logistic services,
wherein the classifier is one of the plurality of classifiers that are applied to the modified shipment details, and
wherein a score of the plurality of scores is a weighted combination of a plurality of classifier outputs identifying probabilities of matches, between the plurality of vendor logistic services and the modified shipment details, and generated using a harmonic mean in the modified shipment details; and
present a recommendation of the vendor logistic service from the plurality of vendor logistic services using the score generated from the output, from a classifier of the plurality of classifiers, that identifies a probability that the vendor logistic service matches to the modified shipment details.

9. The system of claim 8, wherein the plurality of attributes comprises an origin location of the package and a destination location of the package.

10. The system of claim 8, wherein the recommendation engine is further configured to:
obtain, by applying a scanning device to the package, a value for an attribute of the plurality of attributes, wherein the attribute is external to the subset of the plurality of attributes.

11. The system of claim 8, wherein the plurality of logistic preferences comprises preferences corresponding to the package, preferences corresponding to a sender of the package, and preferences corresponding to a recipient of the package.

12. The system of claim 8, wherein the recommendation engine is further configured to:
obtain a plurality of shipment transactions each comprising a value for an attribute of the plurality of attributes, wherein the attribute corresponds to a logistic preference of the plurality of logistic preferences, and
generate the logistic preference by calculating the harmonic mean of the values for the attribute in the plurality of shipment transactions.

13. The system of claim 8, wherein the recommendation engine is further configured to:
train the plurality of classifiers using different subsets of the plurality of shipment transactions, wherein generating the plurality of scores comprises:
applying the plurality of classifiers to the modified shipment details to obtain the plurality of classifier outputs; and
combining, according to a policy, the plurality of classifier outputs.

14. The system of claim 8, further comprising a graphical user interface (GUI), wherein the recommendation engine is further configured to:
- display, in an element within the GUI generated by the computer processor, the recommendation of the vendor logistic service; and
- initiate, via the GUI, an interaction with the vendor logistic service.

15. A method comprising:
- receiving, for a package and via a graphical user interface (GUI) generated by a computer processor, shipment details comprising a plurality of attributes;
- obtaining, for a subset of the plurality of attributes, a plurality of logistic preferences;
- sending the shipment details and the plurality of logistic preferences to a recommendation engine, wherein the recommendation engine:
  - applies the plurality of logistic preferences to the shipment details to obtain modified shipment details;
  - trains a classifier, of a plurality of classifiers, using a plurality of shipment transactions comprising a shipment transaction comprising a plurality of values for the plurality of attributes and labeled with a vendor logistic service of a plurality of vendor logistic services;
  - generates, by applying the classifier to the modified shipment details, a plurality of scores for the plurality of vendor logistic services,
    - wherein the classifier is one of the plurality of classifiers that are applied to the modified shipment details, and
    - wherein a score of the plurality of scores is a weighted combination of a plurality of classifier outputs identifying probabilities of matches, between the plurality of vendor logistic services and the modified shipment details, and generated using a harmonic mean in the modified shipment details; and
  - presents a recommendation of the vendor logistic service from the plurality of vendor logistic services using the score generated from the output, from a classifier of the plurality of classifiers, that identifies a probability that the vendor logistic service matches to the modified shipment details;
- receiving, via the GUI, the recommendation of the vendor logistic service;
- displaying, in an element within the GUI, the recommendation of the vendor logistic service; and
- initiating, via the GUI, an interaction with the vendor logistic service.

16. The method of claim 15, further comprising:
- determining that a recommendation has been requested for the modified shipment details, wherein the modified shipment details are sent to the recommendation engine in response to the determining.

17. The method of claim 15, wherein the plurality of attributes comprises an origin location of the package and a destination location of the package.

18. The method of claim 15, further comprising:
- obtaining, by applying a scanning device to the package, a value for an attribute of the plurality of attributes, wherein the attribute is external to the subset of the plurality of attributes.

19. The method of claim 15, wherein the plurality of logistic preferences comprises preferences corresponding to the package, preferences corresponding to a sender of the package, and preferences corresponding to a recipient of the package.

20. The method of claim 15, further comprising:
- obtaining a plurality of shipment transactions each comprising a value for an attribute of the plurality of attributes, wherein the attribute corresponds to a logistic preference of the plurality of logistic preferences; and
- generating the logistic preference by calculating the harmonic mean of the values for the attribute in the plurality of shipment transactions.

* * * * *